(12) United States Patent
Sato

(10) Patent No.: US 10,756,359 B2
(45) Date of Patent: Aug. 25, 2020

(54) FUEL CELL SYSTEM AND CONTROLLING METHOD OF SAME

(71) Applicant: NISSAN MOTOR CO., LTD., Yokohama-shi, Kanagawa (JP)

(72) Inventor: Yuichi Sato, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 71 days.

(21) Appl. No.: 16/061,413

(22) PCT Filed: Sep. 26, 2016

(86) PCT No.: PCT/JP2016/078211
§ 371 (c)(1),
(2) Date: Jun. 12, 2018

(87) PCT Pub. No.: WO2017/104210
PCT Pub. Date: Jun. 22, 2017

(65) Prior Publication Data
US 2019/0372136 A1  Dec. 5, 2019

(30) Foreign Application Priority Data

Dec. 15, 2015 (JP) ................................. 2015-244487

(51) Int. Cl.
*H01M 8/04014* (2016.01)
*H01M 8/04225* (2016.01)
(Continued)

(52) U.S. Cl.
CPC ... *H01M 8/04014* (2013.01); *H01M 8/04225* (2016.02); *H01M 8/04228* (2016.02);
(Continued)

(58) Field of Classification Search
CPC ......... H01M 8/04014; H01M 8/04225; H01M 8/04228; H01M 8/04303; H01M 8/04343; H01M 8/04731; H01M 8/12
See application file for complete search history.

(56) References Cited

U.S. PATENT DOCUMENTS

| 7,718,289 B2 | 5/2010 | Asai et al. |
| 2004/0115495 A1 | 6/2004 | Asai et al. |

(Continued)

FOREIGN PATENT DOCUMENTS

| CN | 1500294 A | 5/2004 |
| CN | 102509808 A1 | 6/2012 |

(Continued)

*Primary Examiner* — Jonathan G Jelsma
(74) *Attorney, Agent, or Firm* — Foley & Lardner LLP

(57) ABSTRACT

A fuel cell system comprises a solid oxide fuel cell which generates a power by receiving a supply of an anode gas and a cathode gas. The system comprises a cathode gas supply unit to supply the cathode gas to the fuel cell via a cathode gas supply route; a first burner arranged in the cathode gas supply route, a second burner to burn an anode off-gas and a cathode off-gas, which are discharged from the fuel cell; a first branch path which is branched out from an upstream of the first burner and joins to a downstream of the first burner in the cathode gas supply route; and a second branch path which is branched out from a downstream of the first burner in the cathode gas supply route and joins to a cathode off-gas discharge route through which the cathode off-gas is discharged from the fuel cell to the second burner.

12 Claims, 15 Drawing Sheets

(51) Int. Cl.
*H01M 8/04228* (2016.01)
*H01M 8/04303* (2016.01)
*H01M 8/12* (2016.01)
*H01M 8/0432* (2016.01)
*H01M 8/04701* (2016.01)
*H01M 8/04746* (2016.01)
*H01M 8/124* (2016.01)

(52) U.S. Cl.
CPC ... *H01M 8/04303* (2016.02); *H01M 8/04343* (2013.01); *H01M 8/04731* (2013.01); *H01M 8/04776* (2013.01); *H01M 8/12* (2013.01); H01M 2008/1293 (2013.01); H01M 2250/20 (2013.01)

(56) References Cited

U.S. PATENT DOCUMENTS

| | | | |
|---|---|---|---|
| 2006/0014064 A1* | 1/2006 | Ogino | H01M 8/04097 429/425 |
| 2008/0118800 A1 | 5/2008 | Devriendt et al. | |
| 2009/0253007 A1 | 10/2009 | Mergler | |
| 2009/0280361 A1 | 11/2009 | Bitoh et al. | |
| 2011/0189567 A1* | 8/2011 | Venkataraman | B01J 8/0257 429/425 |
| 2012/0003554 A1* | 1/2012 | Ozeki | H01M 8/04223 429/423 |
| 2013/0089799 A1* | 4/2013 | Reuber | B25B 27/302 429/423 |
| 2015/0188174 A1 | 7/2015 | Iwakiri | |
| 2016/0064756 A1 | 3/2016 | Yuzuriha | |
| 2017/0092969 A1 | 3/2017 | Kaneko et al. | |

FOREIGN PATENT DOCUMENTS

| | | |
|---|---|---|
| EP | 2 112 708 A2 | 10/2009 |
| EP | 2 863 464 A1 | 4/2015 |
| EP | 3 147 979 A1 | 3/2017 |
| JP | 2002-110212 A | 4/2002 |
| JP | 2004-111243 A | 4/2004 |
| JP | 2007-66876 A | 3/2007 |
| JP | 2014-207061 A | 10/2014 |
| WO | WO 2015/177949 A1 | 11/2015 |

* cited by examiner

US 10,756,359 B2

FUEL CELL SYSTEM AND CONTROLLING METHOD OF SAME

TECHNICAL FIELD

The present invention relates to a fuel cell system and a controlling method thereof.

BACKGROUND ART

There has been known a solid oxide fuel cell (SOFC) which acts at a comparatively high temperature wherein an anode gas is supplied to one side and a cathode gas (air, etc.) is supplied to the other side. The fuel cell system using a fuel cell like this needs a time before it is completely stopped because this fuel cell must be cooled (JP 2007-066876A). For example, among stationary fuel cell systems, there are some which require one to several days before they are completely stopped.

SUMMARY OF INVENTION

The anode electrode of SOFC is prone to be oxidized at a high temperature. On the other hand, the cathode electrode has a risk of being deteriorated by reaction with an anode gas. Therefore, even in the stop process, an anode gas is supplied to the anode electrode, and a cathode gas is supplied to the cathode electrode.

In addition, there is a risk of discharging the anode gas as an unburnt gas which is not completely reacted in the SOFC during the stop process of the fuel cell system. By treating the unburnt gas with catalytic oxidation process using an exhaust gas burner, discharge of the unburnt gas to atmosphere can be suppressed. The catalyst used in the catalytic oxidation process has a comparatively high action temperature.

However, because temperature of the entire SOFC falls during the stop process, the catalyst in the exhaust gas burner is not in a proper action temperature thereof. Therefore, all the unburnt gas cannot be catalytically oxidized; and thus, there is a problem of a risk to discharge part of the unburnt gas to outside the fuel cell system.

An object of the present invention is to suppress discharge of the unburnt gas to atmosphere during the stop process of a fuel cell system.

According to one embodiment, a fuel cell system comprises a solid oxide fuel cell which generates a power by receiving a supply of an anode gas and a cathode gas. The system comprises a cathode gas supply unit to supply the cathode gas to the fuel cell via a cathode gas supply route; a first burner arranged in the cathode gas supply route, a second burner to burn an anode off-gas and a cathode off-gas, which are discharged from the fuel cell; a first branch path which is branched out from an upstream of the first burner and joins to a downstream of the first burner in the cathode gas supply route; and a second branch path which is branched out from a downstream of the first burner in the cathode gas supply route and joins to a cathode off-gas discharge route through which the cathode off-gas is discharged from the fuel cell to the second burner.

DESCRIPTION OF EMBODIMENTS

Hereunder, embodiments of the present invention will be explained with referring to the attached drawings.

First Embodiment

Figure 1:
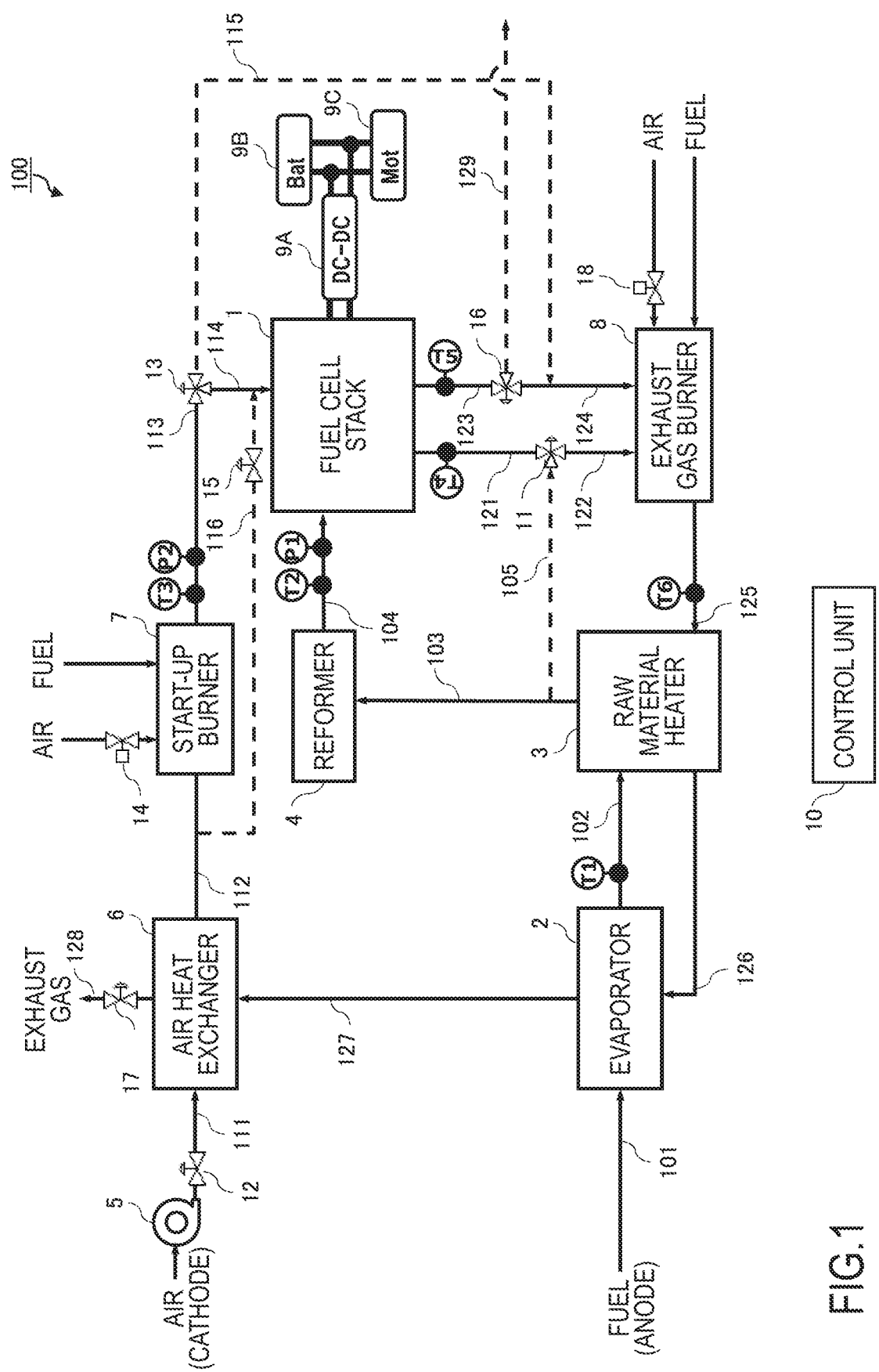
FIG. 1 is a schematic diagram of the fuel cell system according to the first embodiment of the present invention.

FIG. 1 is the rough schematic diagram of the solid oxide fuel cell (SOFC) system in the first embodiment. Meanwhile, the SOFC system illustrated in FIG. 1 is under a normal operation.

A fuel cell stack 1, SOFC, is a stack of the cells configured such that an electrolyte layer formed by a solid oxide such as a ceramic is sandwiched between an anode electrode (fuel electrode) into which an anode gas (fuel gas) is supplied and a cathode electrode (air electrode) into which an air including oxygen is supplied as a cathode gas (oxidizing gas). In the fuel cell stack 1, a fuel such as hydrogen included in the anode gas is caused to react with oxygen in the cathode gas so as to generate a power, and then, the anode gas after the reaction (anode off-gas) and the cathode gas after the reaction (cathode off-gas) are discharged.

The solid oxide fuel cell system having the fuel cell stack 1 (hereinafter, this system is referred to as a fuel cell system 100) is provided with a fuel supply system to supply the anode gas (fuel) to the fuel cell stack 1, an air supply system to supply the cathode gas (air) to the fuel cell stack 1, and an exhausting system to discharge an anode off-gas and a cathode off-gas discharged from the fuel cell stack 1 to outside the fuel cell system 100. In addition, besides these systems, a driving system which is directly connected to the fuel cell stack 1 is arranged.

The fuel supply system comprises an evaporator 2, a raw material heater 3, a reformer 4, etc. The air supply system comprises a compressor 5, an air heat exchanger 6, a start-up burner 7, etc. The exhausting system comprises an exhaust gas burner 8, etc. The driving system comprises a DC-DC converter 9A, a battery 9B, a driving motor 9C, etc. In addition, the fuel cell system 100 comprises a control unit 10 to control the action of the entire system.

The control unit 10 controls the entire fuel cell system 100 by controlling each component of the fuel cell system 100 as well as the valves of each system, etc. Meanwhile, the control unit 10 is provided with a microcomputer comprising a central processing unit (CPU), a read only memory (ROM), a random access memory (RAM), and an input output interface (I/O).

Hereunder, each system will be explained in detail. First, details of the fuel supply system will be explained.

In the fuel supply system, a liquid fuel stored in a fuel tank not shown in the figure is supplied to the fuel cell stack 1 via the evaporator 2, the raw material heater 3, and the reformer 4. With regard to the fuel, a water-containing ethanol, i.e., a mixture of ethanol with water is used, among others.

The route of the fuel in the fuel supply system comprises a path 101 from the fuel tank to the evaporator 2, a path 102 from the evaporator 2 to the raw material heater 3, a path 103 from the raw material heater 3 to the reformer 4, and a path 104 from the reformer 4 to the fuel cell stack 1. In addition, a branch path 105 is arranged which is branched out in the midway of the path 103 so as to join to a path 121 and a path 122 through which the anode off-gas is discharged from the fuel cell stack 1.

The path 121 and the path 122 are connected via a valve 11, and the branch path 105 joins to them at the valve 11. Switching between shut-down and conduction of the branch path 105 is executed by open and close of the valve 11. During normal operation, the branch path 105 is shut down by the valve 11, whereby the path 121 and the path 122 are in the state of being conducted. Meanwhile, the path 102 is provided with a temperature sensor T1, and the path 104 is provided with a temperature sensor T2 and a pressure sensor P1.

The evaporator 2 evaporates the fuel by utilizing the heat of the exhaust gas that is discharged from the exhaust gas burner 8. The raw material heater 3 heats the vaporized fuel gas further up to the temperature at which the evaporated fuel gas can be reformed in the reformer 4 by using the heat of the exhaust gas from the exhaust gas burner 8. Specifically, the liquid fuel whose temperature in the path 101 was about 30° C. becomes the fuel gas whose temperature is about 400° C. in the path 102. In the path 103, the fuel gas is further heated up to the temperature of about 660° C. Then, the fuel gas is reformed to the anode gas by the reformer 4.

The reformer 4 reforms the fuel to the anode gas by a catalytic reaction, and this anode gas is supplied to the anode electrode of the fuel cell stack 1. For example, the fuel, i.e., the water-containing ethanol, is reformed to the anode gas including methane, hydrogen, carbon monoxide, etc. Because heat absorption takes place by the catalytic reaction in the reformer 4, the temperature of the anode gas in the path 104 becomes about 520° C.

Next, details of the air supply system will be explained.

In the air supply system, the cathode gas which is taken into the system from outside is supplied to the fuel cell stack 1 via the compressor 5, the air heat exchanger 6, and the start-up burner 7. Meanwhile, the compressor 5 is one example of the cathode gas supply units; and thus, a blower or the like may be used in place of it.

The air route in the air supply system comprises a path 111 from the compressor 5 to the air heat exchanger 6, a path 112 from the air heat exchanger 6 to the start-up burner 7, and a path 113 and a path 114 from the start-up burner 7 to the fuel cell stack 1. The path 113 and the path 114 are connected via a valve 13. In addition, a branch path 115 is arranged which is branched out from the valve 13 so as to join to a path 124 through which the cathode off-gas is discharged from the fuel cell stack 1. By operating the valve 13, the supply destination of the cathode gas from the start-up burner 7 is switched over to the fuel cell stack 1 via the path 114 or to the exhaust gas burner 8 via the branch path 115. During normal operation, by the valve 13, the path 113 and the path 114 are conducted while the branch path 115 is shut down.

In addition, the path 111 is provided with a valve 12; and, during operation of the fuel cell system 100, the cathode gas is taken into the fuel cell system 100 by opening the valve 12. In addition, a branch path 116 is arranged which is branched out in the midway of the path 112 and joins to the path 114. The branch path 116 is provided with a valve 15. By opening and closing the valve 15, shut-down and conduction of the branch path 116 are switched over. The valve 15 is closed during normal operation so that the branch path 116 is shut down. Meanwhile, the path 113 is provided with a temperature sensor T3 and a pressure sensor P2.

The air heat exchanger 6 heats the cathode gas by utilizing the heat of the exhaust gas from the exhaust gas burner 8. The start-up burner 7 is configured so as to be able to burn by mixing the fuel and the air supplied from outside. The start-up burner 7 is started up at the start-up or the like of the fuel cell system 100 so as to supply the heated cathode gas to the fuel cell stack 1. In addition, the supply route of the air from outside to the start-up burner 7 is provided with a valve 14. By using the valve 14, a burning amount of the start-up burner 7 can be controlled. Meanwhile, the temperature of the cathode gas is about 60° C. in the path 111, about 300° C. in the path 112, and about 700° C. in the path 113.

Next, details of the exhausting system will be explained.

From the fuel cell stack 1, the anode off-gas is discharged via the path 121 and the path 122, and the cathode off-gas is discharged via a path 123 and the path 124. The anode off-gas and the cathode off-gas are burnt in the exhaust gas burner 8 so as to become an exhaust gas. The exhaust gas is discharged to outside via the raw material heater 3, the evaporator 2, and the air heat exchanger 6.

The route in the exhausting system comprises the path 121 and the path 122 for the anode off-gas, the path 123 and the path 124 for the cathode off-gas, the both off-gases being discharged from the fuel cell stack 1, a path 125 from the exhaust gas burner 8 to the raw material heater 3, a path 126 from the raw material heater 3 to the evaporator 2, a path 127 from the evaporator 2 to the air heat exchanger 6, and a path 128 from the air heat exchanger 6 to outside.

The anode off-gas of the path 121 and the path 122 as well as the cathode off-gas of the path 123 and the path 124, the temperature of these gases having been about 750° C., is burnt in the exhaust gas burner 8 so as to be discharged to the path 125 as the exhaust gas with the temperature of about 760° C. The temperature of this exhaust gas becomes about 720° C. in the path 126, about 550° C. in the path 127, and about 410° C. in the path 128.

A valve 16 is arranged between the path 123 and the path 124, and an exhaust gas path 129 capable of discharging the cathode off-gas to outside is branched out from the valve 16. By controlling the valve 16, the discharge destination of the cathode-off gas from the fuel cell stack 1 is switched over either to the exhaust gas burner 8 via the path 124 or to outside the fuel cell system 100 via the exhaust gas path 129. During normal operation, the valve 16 is closed so that the exhaust gas path 129 is shut down.

The path 128 is provided with a valve 17; and when the fuel cell system 100 is stopped, a valve 18 is closed so as to prevent a reverse flow of an air to the fuel cell stack 1 via the path 128.

The exhaust gas burner 8 is provided with a catalyst formed of a ceramic material such as an alumina, wherein the anode off-gas and the cathode off-gas are mixed so as to be oxidized to form the exhaust gas mainly comprising carbon dioxide and water. In this catalytic oxidation reaction, there is a temperature range in which the reaction proceeds properly. The temperatures of the anode off-gas and the cathode off-gas discharged from the fuel cell stack 1 are high during normal operation, so that the catalytic oxidation reaction proceeds properly in the exhaust gas burner 8.

Because the catalytic oxidation reaction is an exothermic reaction, the temperature of the exhaust gas from the exhaust gas burner 8 is higher than the temperatures of the anode off-gas and the cathode off-gas. The exhaust gas burner 8 is configured such that the fuel and an air, both being supplied from outside, are mixed such that they can be burnt. The fuel and an air are supplied to the exhaust gas burner 8 such that the ratio of the anode off-gas and the cathode off-gas may be optimum in the catalytic combustion reaction. The catalytic combustion reaction in the exhaust gas burner 8 is controlled by the valve 18 that is arranged in the supply route of an outside air.

Meanwhile, the path 121 is provided with a temperature sensor T4, the path 123 with a temperature sensor T5, and the path 125 with a temperature sensor T6, respectively.

Next, the driving system will be explained.

The DC-DC converter 9A is connected to the fuel cell stack 1 so as to increase an output voltage of the fuel cell stack 1 thereby supplying a power to the battery 9B or to the driving motor 9C. The battery 9B is charged with the power that is supplied from the DC-DC converter 9A, and also supplies the power to the driving motor 9C. The driving motor 9C is connected to the battery 9B and the DC-DC converter 9A via an inverter (not shown in the figure), and serves as a power source of a vehicle.

Next, the stop control process of the fuel cell system 100 will be explained. Meanwhile, this stop control process starts when a vehicle mounted with the fuel cell system 100 is stopped, or when a stop button of the fuel cell system 100 is pushed, or when a secondary battery which stores the power generated in the fuel cell stack 1 is fully charged. The stop control process continues until the fuel cell system 100 reaches a state of being cooled only naturally as the fuel cell system 100 is cooled so that a risk of oxidation of the anode electrode of the fuel cell stack 1 is decreased. The system stop control, which is the stop control process of the fuel cell system 100, is the control that is executed during stop of the system, wherein "during stop of the system" means the period from a start of the system stop control till a next start-up of the system.

Figure 2:
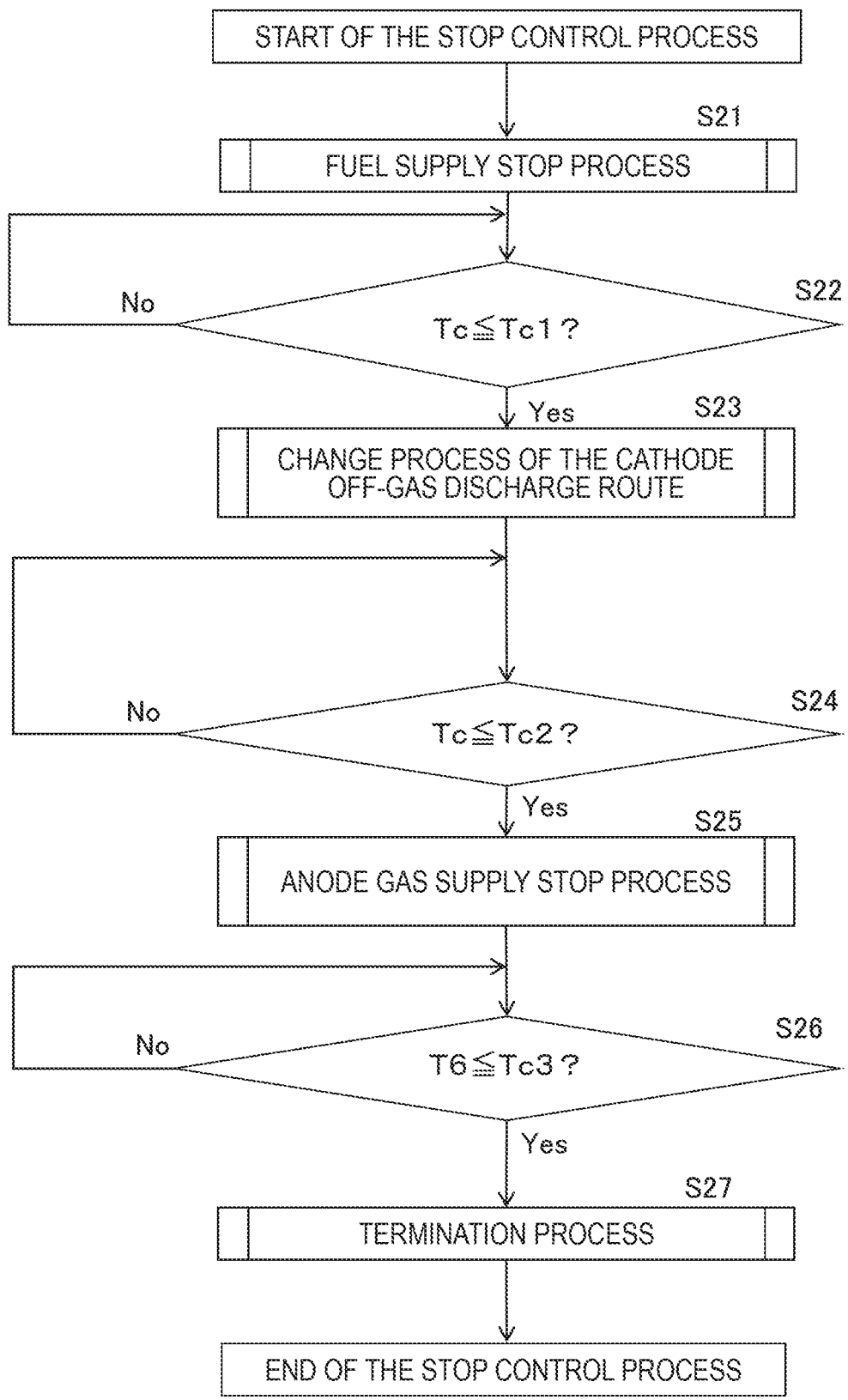
FIG. 2 is a flow chart illustrating the stop control process of the fuel cell system.

FIG. 2 is a flow chart illustrating the stop control process. These controls are executed by the control unit 10.

In Step S21, the fuel supply stop process is executed. Details of the fuel supply stop process will be explained later by using FIG. 3A and FIG. 3B.

In Step S22, judgement is made whether or not a temperature Tc of the fuel cell stack 1 is equal to or lower than a discharge route change temperature Tc1 (for example, 500° C.). If the temperature Tc of the fuel cell stack 1 is higher than the discharge route change temperature Tc1 (S22: No), the process of S22 is continued. On the other hand, if the temperature Tc of the fuel cell stack 1 is equal to or lower than the discharge route change temperature Tc1 (S22: Yes), the process is advanced to Step S23. Meanwhile, the temperature Tc of the fuel cell stack 1 may be obtained by a temperature sensor (not show in the figure) arranged in the fuel cell stack 1 or may be estimated from the temperatures measured by the temperature sensors T4, T5, etc.

Meanwhile, when the temperature of the fuel cell stack 1 falls thereby supplying the cathode off-gas having a comparatively low temperature from the fuel cell stack 1 to the exhaust gas burner 8, the temperature of the exhaust gas burner 8 falls thereby leading to the state in which the catalytic oxidation reaction cannot proceed. The discharge route change temperature Tc1 is the temperature of the fuel cell stack 1 at which a risk of leading to the state like this is caused.

In Step S23, the change process of the cathode off-gas discharge route is executed. Details of the change process of the cathode off-gas discharge route will be explained later by using FIG. 4A and FIG. 4B.

In Step S24, judgement is made whether or not the temperature Tc of the fuel cell stack 1 is equal to or lower than a stop temperature Tc2 (for example, 300° C.). If the temperature Tc of the fuel cell stack 1 is higher than the stop temperature Tc2 (S24: No), the process of S24 is continued. On the other hand, if the temperature Tc of the fuel cell stack 1 is equal to or lower than the stop temperature Tc2 (S24: Yes), the process is advanced to Step S25. Meanwhile, the stop temperature Tc2 is the temperature at which the anode electrode of the fuel cell stack 1 is not oxidized even if it is contacted with oxygen.

In Step S25, the anode gas supply stop process is executed. Details of the anode gas supply stop process will be explained later by using FIG. 5A and FIG. 5B.

In Step S26, judgement is made whether or not a temperature T6 of the temperature sensor T6 showing the exit temperature of the exhaust gas burner 8 is equal to or lower than a stop temperature Tc3 (for example, 730° C.). If the exit temperature T6 of the exhaust gas burner 8 is higher than the stop temperature Tc3 (S26: No), the process of Step S26 is continued. On the other hand, if the exit temperature T6 of the exhaust gas burner 8 is equal to or lower than the stop temperature Tc3 (S26: Yes), the process is advanced to Step S27.

In Step S27, the termination process is executed. Details of the termination process will be explained later by using FIG. 6A and FIG. 6B.

Next, by using FIG. 3A to FIG. 6B, details of the fuel supply stop process (S21), the change process of the cathode off-gas discharge route (S23), the anode gas supply stop process (S25), and the termination process (S27), in FIG. 2, will be explained.

First, details of the fuel supply stop process will be explained by using FIG. 3A and FIG. 3B.

Figure 3A:
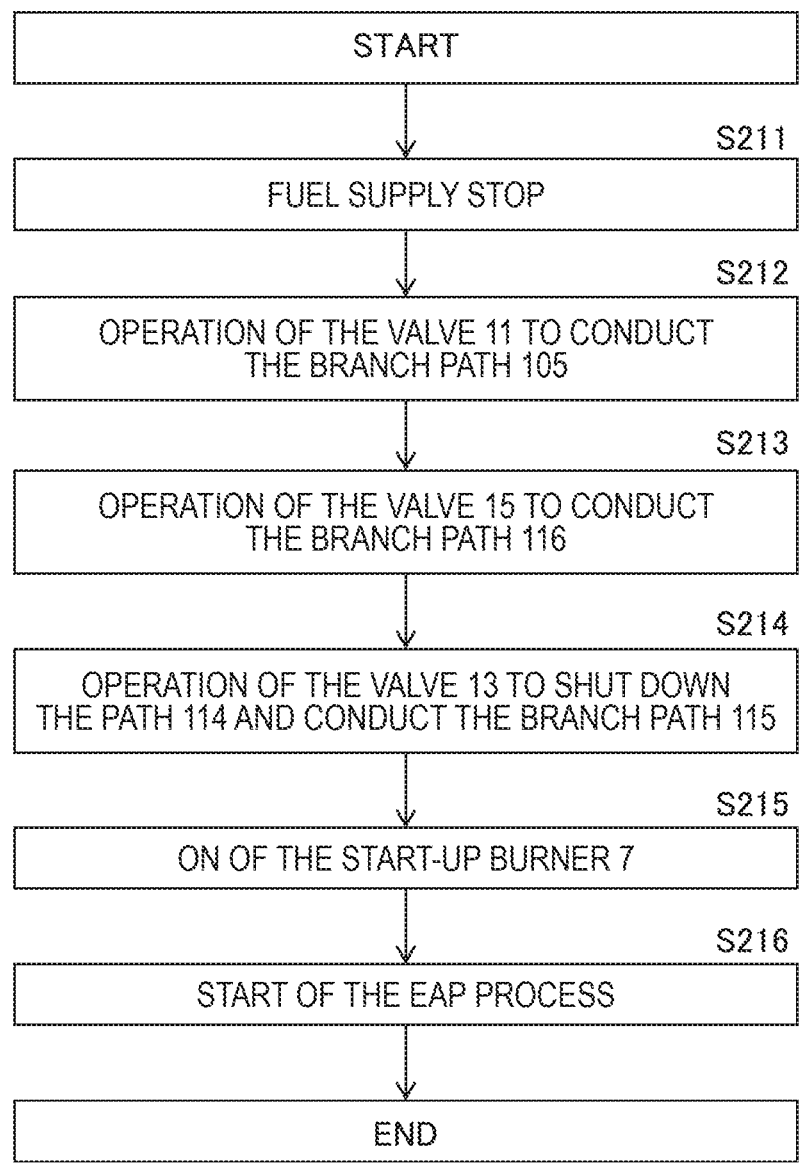
FIG. 3A is a flow chart illustrating the fuel supply stop process.
Figure 3B:
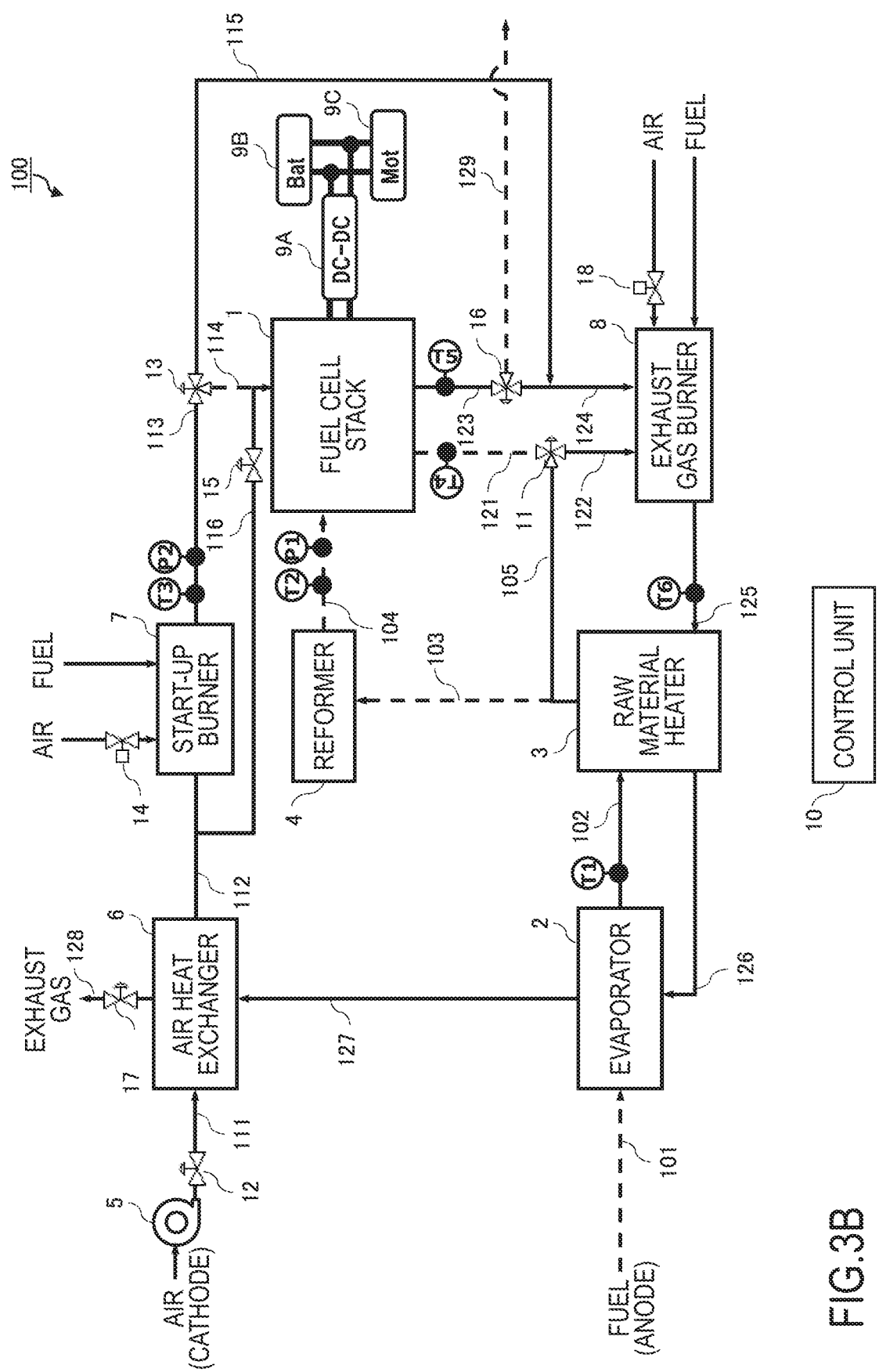
FIG. 3B is a schematic diagram of the fuel cell system during the fuel supply stop process.

In FIG. 3A, details of the fuel supply stop process is illustrated; and FIG. 3B illustrates the schematic diagram of the fuel cell stack during the fuel supply stop process is executed.

First, in the fuel supply system, the path 101 is shut down, so that the fuel supply to the fuel cell system 100 is stopped (S211). And, by operating the valve 11, the branch path 105 is conducted (S212). By so doing, the fuel that is remained in the evaporator 2, the path 102, and the raw material heater 3 in the fuel supply system is supplied to the exhaust gas burner 8 via the branch path 105. Accordingly, supply of the anode gas to the fuel cell stack 1 is stopped; and thus, power generation in the fuel cell stack 1 decreases.

In the air supply system, by operating the valve 15, the branch path 116 is conducted (S213). Further, by operating the valve 13, the path 114 is shut down, and at the same time the branch path 115 is conducted (S214). And, the start-up burner 7 is started (S215). Because the compressor 5 is continuing the action thereof, the cathode gas before being supplied to the start-up burner 7 is supplied to the fuel cell stack 1 via the branch path 116. Accordingly, the fuel cell stack 1 is gradually cooled down by the cathode gas having a comparatively low temperature (about 310° C.). Also, the cathode gas heated by the start-up heater 7 to about 700° C. is supplied to the exhaust gas burner 8 via the branch path 115. Because of this, temperature in the exhaust gas burner 8 is suitable for the catalytic reaction; and thus, the catalytic combustion reaction proceeds properly.

In the driving system, the EAP process is executed (S216). Specifically, an inversely biased voltage is applied to the fuel cell stack 1 from the battery 9B via the DC-DC converter 9A. By so doing, oxidation of the anode electrode of the fuel cell stack 1 is suppressed.

Next, details of the change process of the cathode off-gas discharge route (S23) will be explained by using FIG. 4A and FIG. 4B.

Figure 4A:
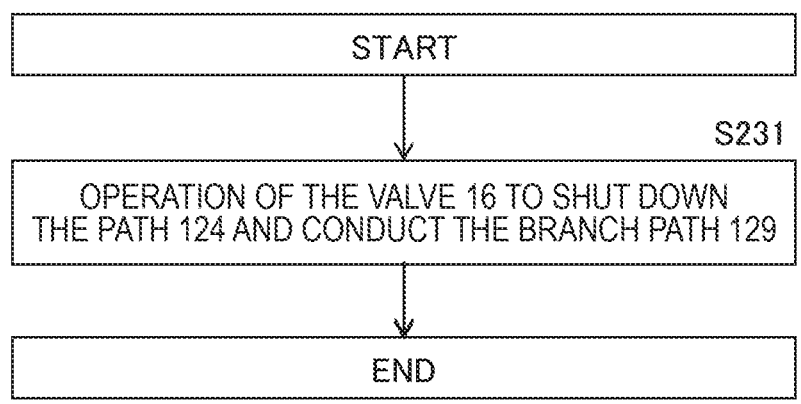
FIG. 4A is a flow chart illustrating the change process of the anode off-gas discharge route.
Figure 4B:
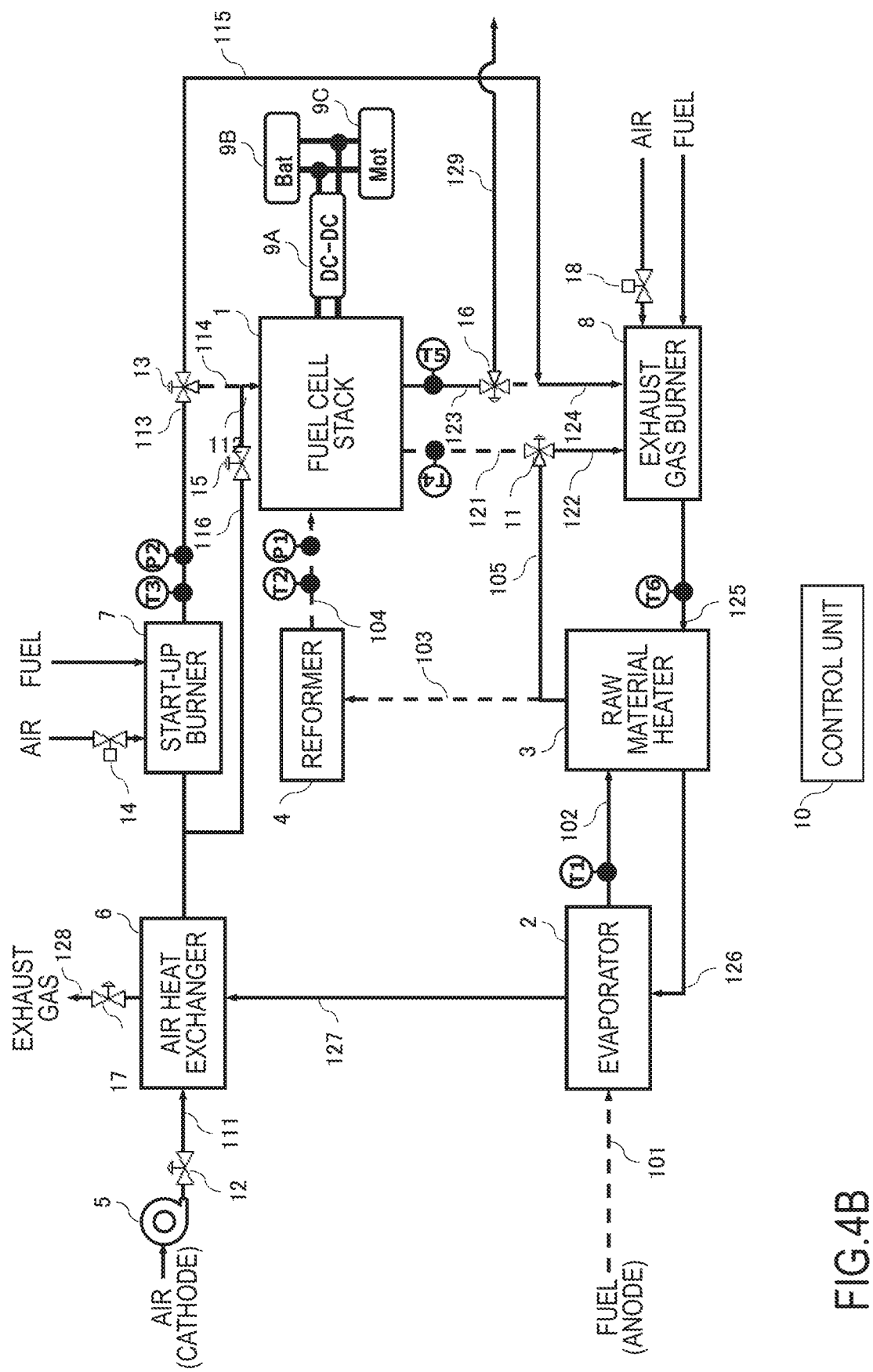
FIG. 4B is a schematic diagram of the fuel cell system during the change process of the anode off-gas discharge route.

In FIG. 4A, details of the change process of the cathode off-gas discharge route is illustrated; and in FIG. 4B, the schematic diagram of the fuel cell stack during the change process of the cathode off-gas discharge route is executed is illustrated.

First, the branching process (S22), shown in FIG. 2, which is executed prior to the change process of the cathode off-gas discharge route (S23), will be explained. As the fuel cell stack 1 is cooled down, the temperature Tc of the fuel cell stack 1 becomes equal to or lower than the discharge route change temperature Tc1 (about 500° C.) (S22: Yes). Under this state, the temperature of the cathode off-gas which is supplied to the exhaust gas burner 8 from the fuel cell stack 1 via the path 123 and the path 124 is low; and thus, even if the cathode gas having a high temperature is supplied from the start-up burner 7 via the branch path 115, the temperature of the exhaust gas burner 8 falls to the temperature at which the catalytic oxidation reaction cannot proceed. Because of this, the change process of the cathode off-gas discharge route is executed (S23). On the other hand, if the temperature Tc of the fuel cell stack 1 is higher than the discharge route change temperature Tc1 (S22: No), the temperature of the exhaust gas burner 8 is suitable for the catalytic oxidation reaction to proceed; and thus, the process of S22 is continued.

Here, referring to FIG. 4A and FIG. 4B, in the change process of the cathode off-gas discharge route (S23), the valve 16 is operated so as to shut down the path 124 and conduct the exhaust gas path 129 (S231). By so doing, the cathode off-gas discharged from the fuel cell stack 1 via the path 123 is discharged to outside via the exhaust gas path 129. Because of this, the cathode off-gas having a lowered temperature is not supplied to the exhaust gas burner 8.

Therefore, because only the cathode gas having a high temperature is supplied to the exhaust gas burner 8 from the start-up burner 7 via the branch path 115, fall of the temperature in the exhaust gas burner 8 is suppressed, so that the temperature at which the catalytic oxidation reaction can proceed can be ensured. Because the catalytic oxidation reaction is carried out properly in the exhaust gas burner 8, the unburnt gas included in the anode off-gas is prevented from being discharged to atmosphere. Accordingly, with cooling the fuel cell stack 1, the temperature of the exhaust gas burner 8 can be kept at the level where the catalytic oxidation reaction can proceed.

Next, details of the anode gas supply stop process (S25) will be explained by using FIG. 5A and FIG. 5B.

Figure 5A:
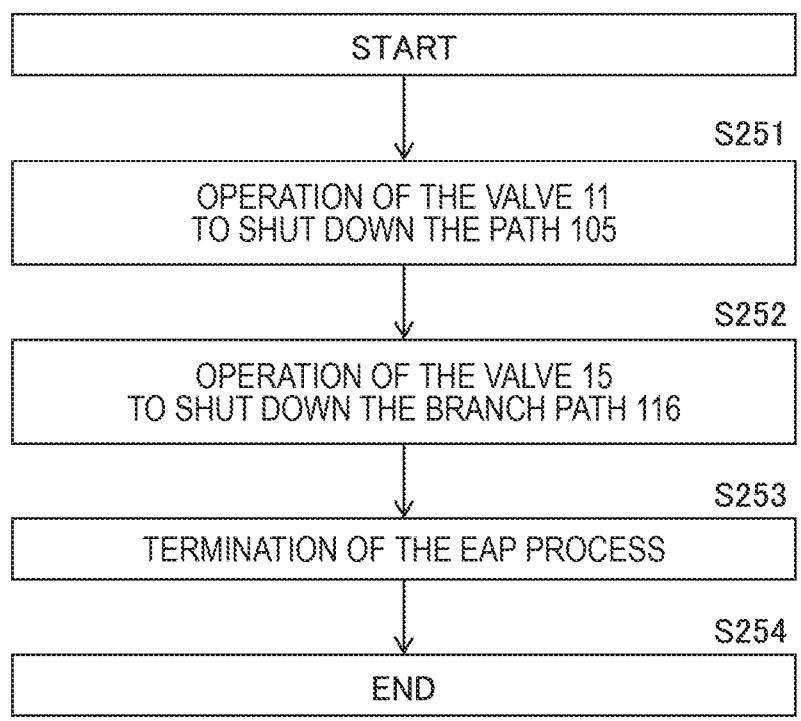
FIG. 5A is a flow chart illustrating the anode gas supply stop process.
Figure 5B:
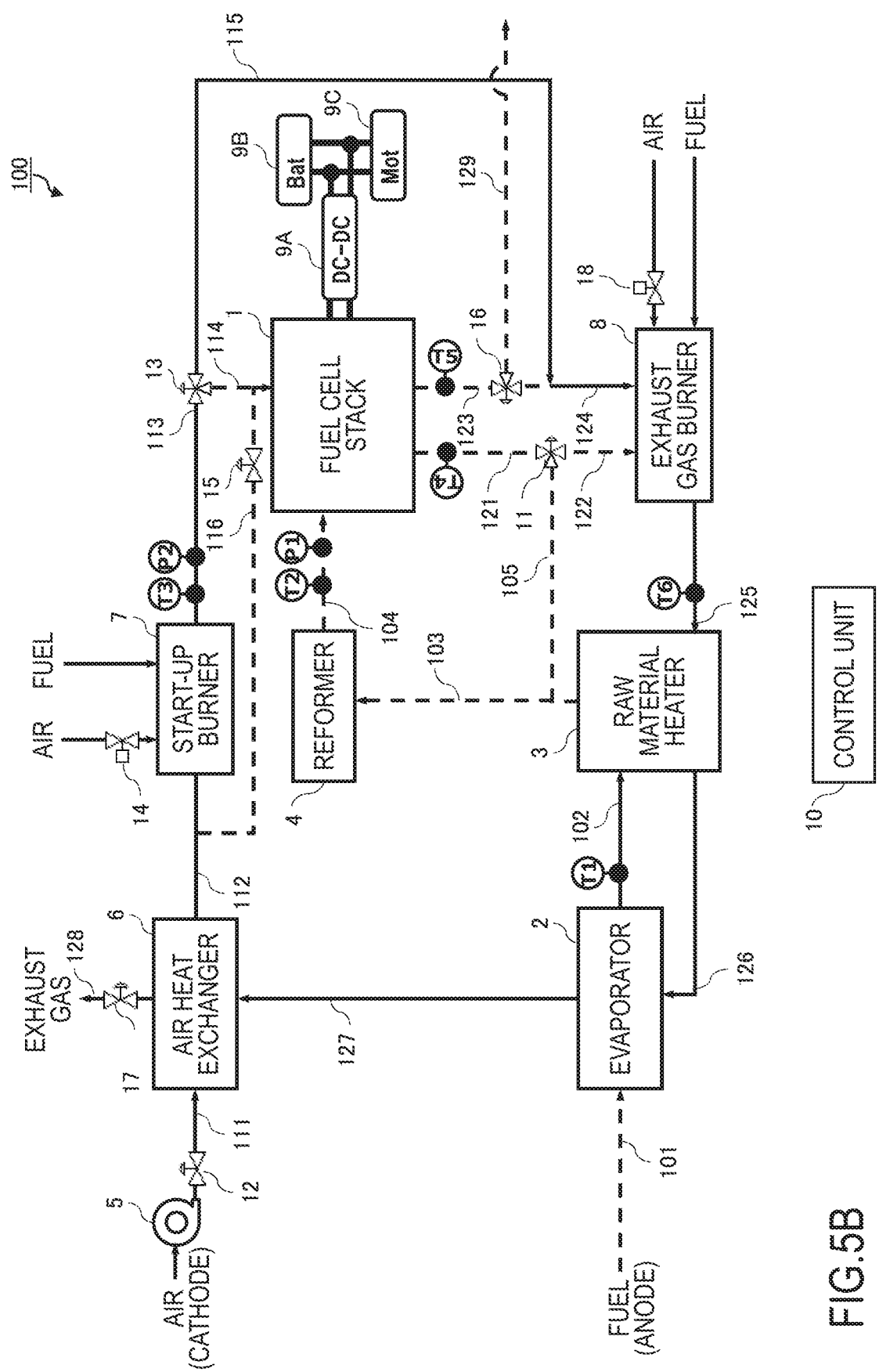
FIG. 5B is a schematic diagram of the fuel cell system during the anode gas supply stop process.

In FIG. 5A, details of the anode gas supply stop process is illustrated; and in FIG. 5B, the schematic diagram of the fuel cell stack during the anode gas supply stop process is executed is illustrated.

First, the branching process (S24), as shown in FIG. 2, which is executed prior to the anode gas supply stop process (S25), will be explained. As the fuel cell stack 1 is further cooled down thereby leading to fall of the temperature Tc in the fuel cell stack 1 until it becomes equal to or lower than the stop temperature Tc2 (about 300° C.) (S24: Yes), it is judged that oxidation does not proceed even if the anode electrode of the fuel cell stack 1 contacts to an air; and thus, the anode gas supply stop process (S25) is executed. On the other hand, if the temperature Tc of the fuel cell stack 1 is higher than the stop temperature Tc2 (S24: No), oxidation takes place when the anode electrode of the fuel cell stack 1 contacts to an air; and thus, it is judged that further cooling down of the fuel cell stack 1 is necessary, so that the process of S24 is continued.

Here, referring to FIG. 5A and FIG. 5B, in the anode gas supply stop process (S25), the branch path 105 is shut down by operating the valve 11, so that supply of the fuel to the exhaust gas burner 8 is stopped (S251). And, the branch path 116 is shut down by operating the valve 15, so that supply of the cathode gas to the fuel cell stack 1 is stopped (S252). And the EAP process is stopped (S253). By so doing, the cooling process of the fuel cell stack 1 is terminated, and from then on, the fuel cell stack 1 is cooled naturally. Meanwhile, the cathode gas having a high temperature passed through the compressor 5, air heat exchanger 6, and the start-up burner 7 is supplied to the exhaust gas burner 8 via the branch path 115. Because of this, the catalytic oxidation reaction can proceed properly in the exhaust gas burner 8.

Next, details of the stop process (S27) will be explained by using FIG. 6A and FIG. 6B.

Figure 6A:
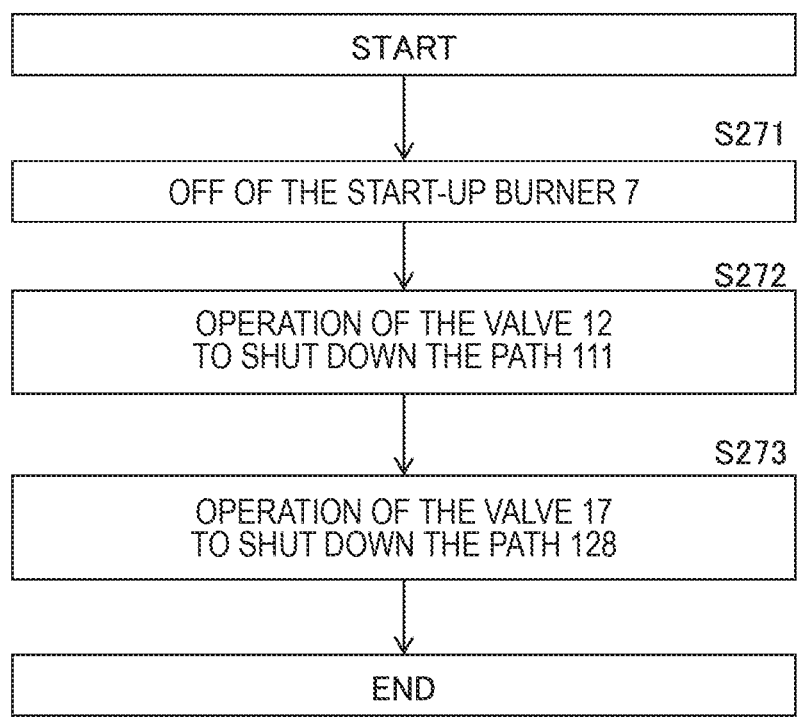
FIG. 6A is a flow chart illustrating the termination process.
Figure 6B:
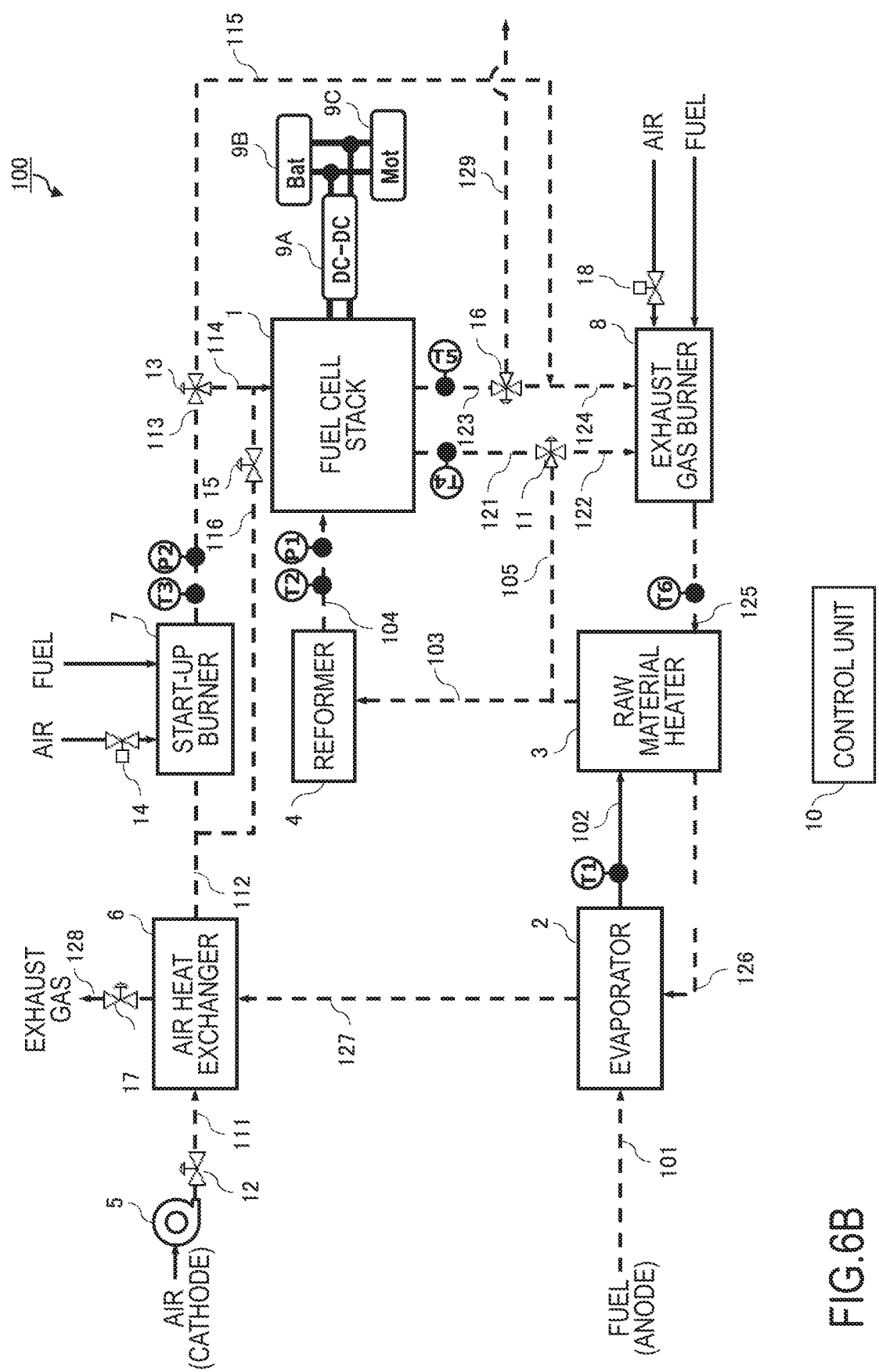
FIG. 6B is a schematic diagram of the fuel cell system during the termination process.

In FIG. 6A, details of the process is illustrated; and in FIG. 6B, the schematic diagram of the fuel cell stack 1 during the stop process is executed is illustrated.

First, the branching process (S26), as shown in FIG. 2, which is executed prior to the stop process (S27), will be explained. The cathode gas having a temperature of about 700° C. is supplied to the exhaust gas burner 8 from the start-up heater 7 via the branch path 115. During the unburned gas is remained in the fuel supply system, the catalytic combustion reaction proceeds in the exhaust gas burner 8. Because of this, the temperature of the exhaust gas from the exhaust gas burner 8 to the path 125 becomes about 760° C. However, when the unburnt gas is not included in the fuel supply system any more, the temperature of the exhaust gas from the exhaust gas burner 8 to the path 125 falls because the catalytic combustion reaction does not take place in the exhaust gas burner 8.

Then, if the exit temperature T6 of the exhaust gas burner 8 detected by the temperature sensor T6 in the path 125 is equal to or lower than the stop temperature Tc3 (S26: Yes), it is judged that there is no unburnt gas remained in the fuel supply system, so that the stop process (S27) is executed. On the other hand, if the exit temperature T6 is equal to or higher than the stop temperature Tc3 (S26: No), it is judged that there is the unburnt gas still remained in the fuel supply system, so that the process of S26 is continued.

Here, referring to FIG. 6A and FIG. 6B, in the stop process (S27), the start-up burner 7 is stopped (S271), and at the same time the compressor 5 is stopped. And, the valve 12 is operated so as to shut down the path 111 (S272). And, by operating the valve 17 so as to shut down the path 128 (S273), the reverse flow of an air into the fuel cell system 100 is prevented. When this state is reached, inside the fuel cell system 100 becomes in the state of being airtight. Under this state, natural cooling of the fuel cell stack 1 is continued until the temperature thereof becomes equal to the outside temperature.

Figure 7:
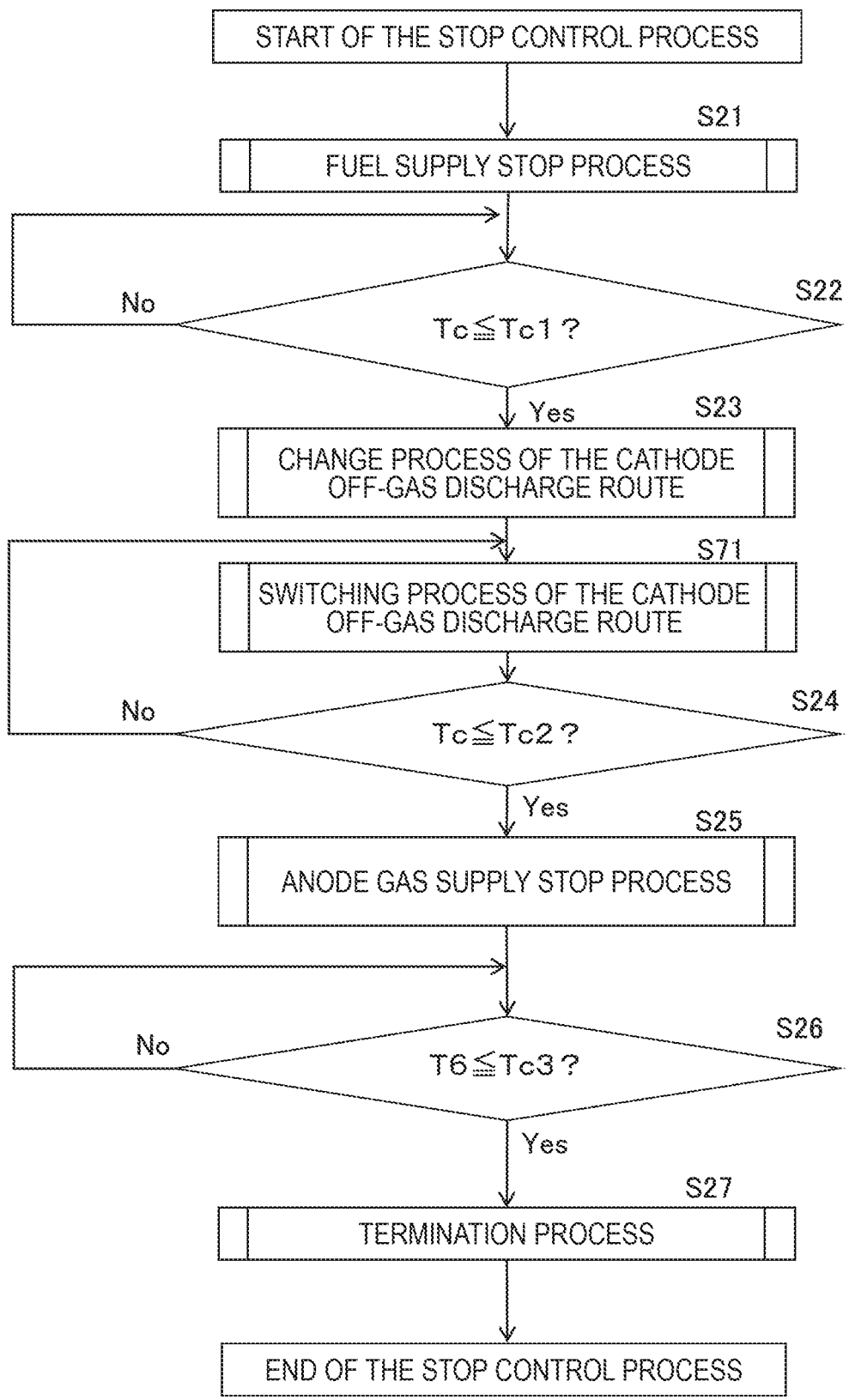
FIG. 7 is a flow chart illustrating another stop control process of the fuel cell system.

In FIG. 7, another example of the stop control process is illustrated.

Referring to FIG. 7, after the change process of the cathode off-gas discharge route is started (S23), the switching process of the cathode off-gas discharge route is executed (S71). When the temperature Tc of the fuel cell stack 1 is higher than the stop temperature Tc2 (S24: No), it is judged that cooling of the fuel cell stack 1 needs to be continued, thereby returning to the process of S71.

In the switching process of the cathode off-gas discharge route, the valve 16 is operated such that the temperature of the exhaust gas burner 8 may be within a proper range in which the catalytic oxidation reaction can proceed. By operating the valve 16, the discharge destination of the cathode off-gas is switched over to the path 124 or to the exhaust gas path 129. Because of this, the flow of the cathode off-gas having a comparatively low temperature into the exhaust gas burner 8 is controlled, so that the exhaust gas burner 8 becomes a proper temperature; and thus, the catalytic combustion reaction proceeds properly.

The switching process of the cathode off-gas discharge route will be explained by using FIG. 8A and FIG. 8B.

Figure 8A:
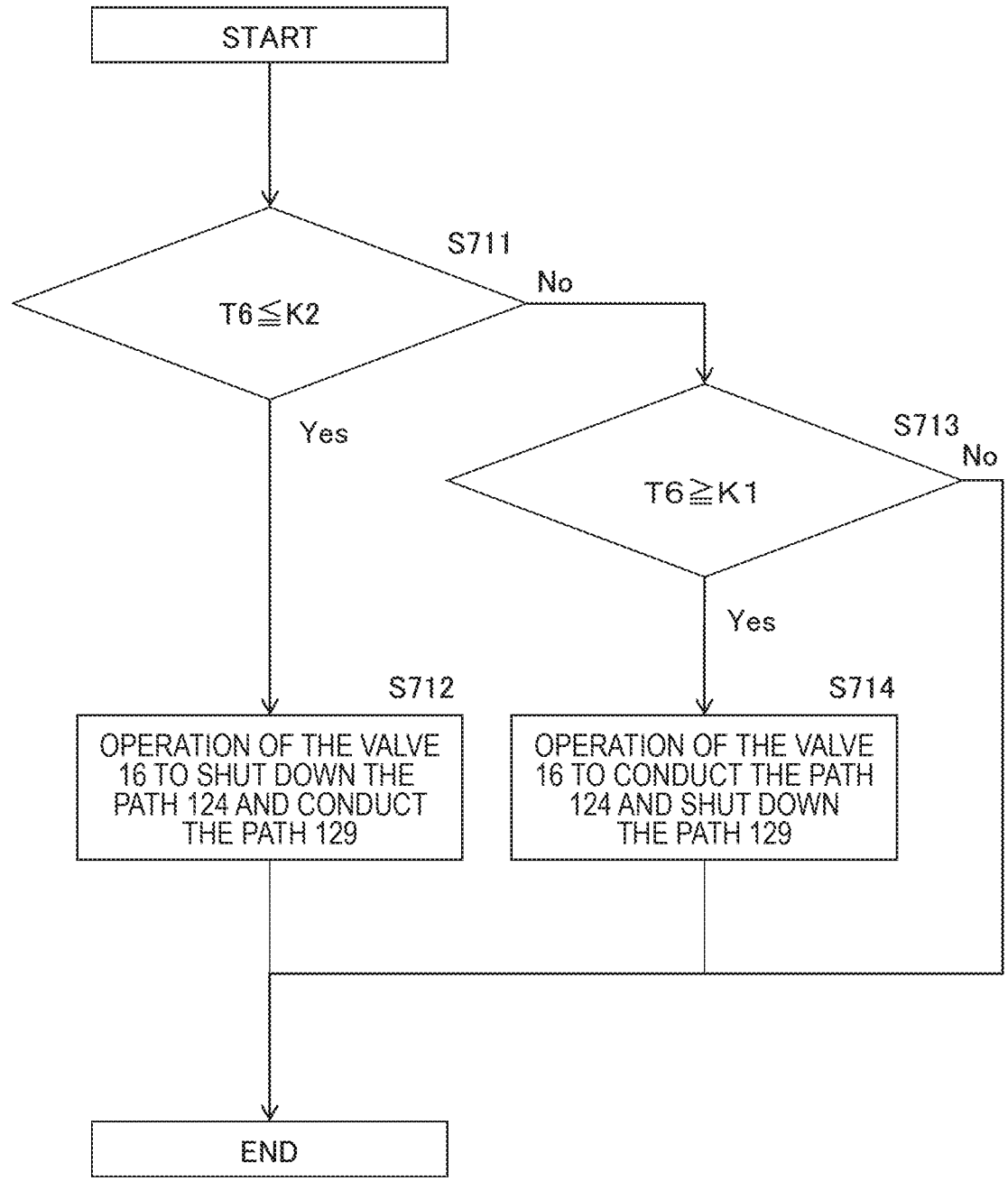
FIG. 8A is a flow chart illustrating the switching process of the cathode off-gas discharge route.
Figure 8B:
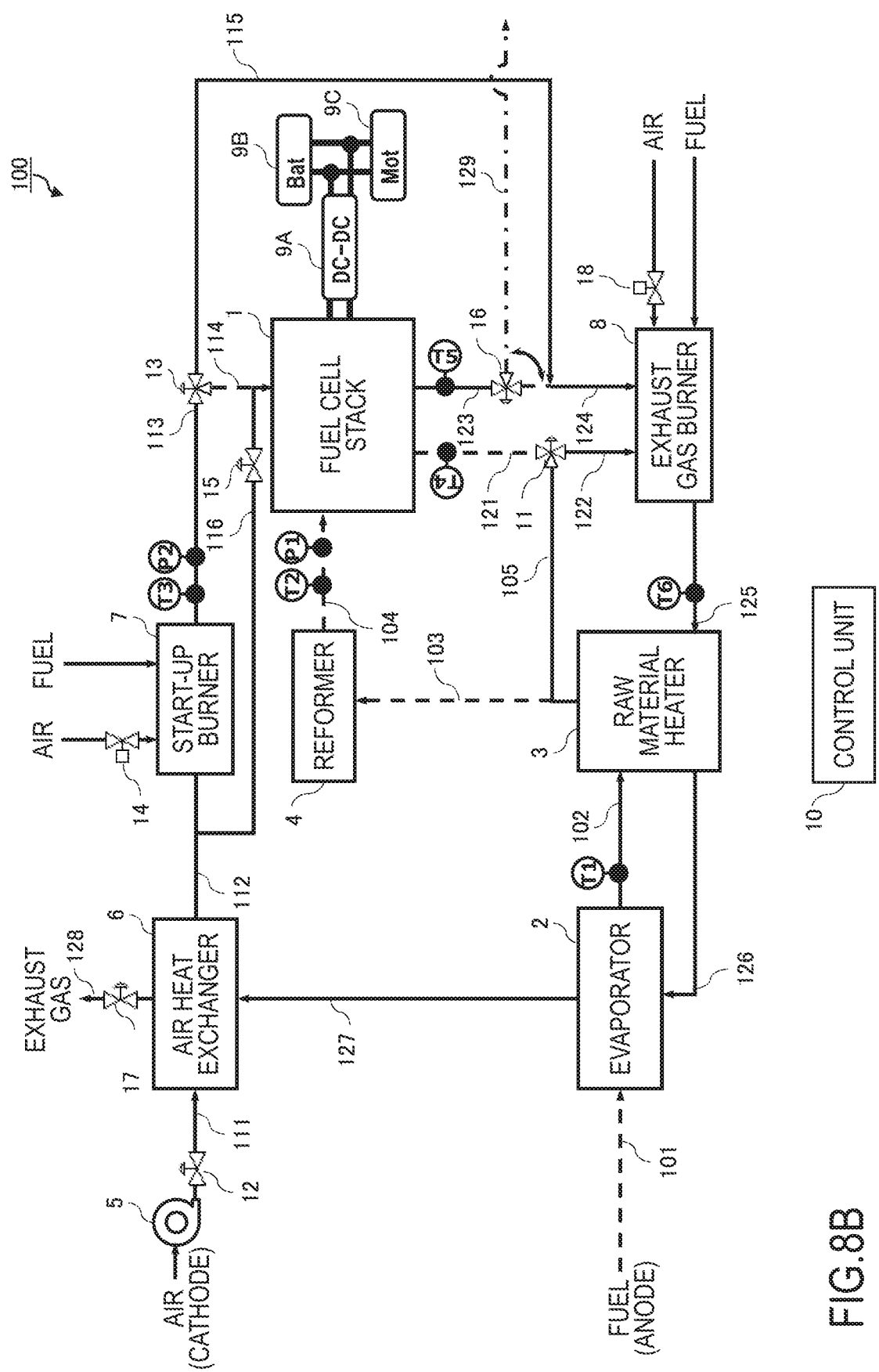
FIG. 8B is a schematic diagram of the fuel cell system during the switching process of the cathode off-gas discharge route.

In FIG. 8A, the flow chart of the switching process of the cathode off-gas discharge route is illustrated; and FIG. 8B illustrates the schematic diagram of the fuel cell stack 1 during the switching process of the cathode off-gas discharge route is executed.

K1 designates an upper temperature limit of the temperature range in which the catalytic oxidation reaction can proceed in the exhaust gas burner 8 (upper burning temperature limit), and K2 designates a lower temperature limit thereof (lower burning temperature limit). As illustrated in FIG. 8B, in this switching process, the discharge destination of the cathode off-gas from the fuel cell stack 1 is switched over to the path 124 or to the exhaust gas path 129.

In Step S711, judgement is made whether or not the exit temperature T6 of the exhaust gas burner 8 is equal to or lower than the lower burning temperature limit K2. If the exit temperature T6 of the exhaust gas burner 8 is equal to or lower than the lower burning temperature limit K2 (S711: Yes), it is judged that fall of the temperature in the exhaust gas burner 8 needs to be suppressed, so that the process is advanced to S712. On the other hand, if the exit temperature T6 of the exhaust gas burner 8 is higher than the lower burning temperature limit K2 (S711: No), the process is advanced to S713.

In Step S712, the valve 16 is operated so as to discharge the cathode off-gas which is discharged from the fuel cell stack 1 not to the path 124 but to outside the fuel cell system 100 via the exhaust gas path 129. By so doing, only the cathode gas having a high temperature is supplied to the exhaust gas burner 8 from the start-up burner 7 via the branch path 115 thereby suppressing fall of the temperature in the exhaust gas burner 8; and thus, the temperature therein is within the temperature range in which the catalytic oxidation reaction can proceed. When the process of S712 is over, the switching process of the cathode off gas discharge route (S71) is terminated.

In Step S713, judgement is made whether or not the exit temperature T6 of the exhaust gas burner 8 is equal to or higher than the upper burning temperature limit K1. If the exit temperature T6 of the exhaust gas burner 8 is equal to or higher than the upper burning temperature limit K1, it is judged that raising of the temperature in the exhaust gas burner 8 needs to be suppressed, so that the process is advanced to S714. On the other hand, if the exit temperature T6 of the exhaust gas burner 8 is higher than the lower burning temperature limit K2, it is judged that the exhaust gas burner 8 is in the proper temperature range in which the catalytic oxidation reaction can proceed, so that the switching process of the cathode off gas discharge route (S71) is terminated.

In step S714, by operating the valve 16, the cathode off-gas discharged from the fuel cell stack 1 to the path 123 is supplied to the exhaust gas burner 8 via the path 124, not to the exhaust gas path 129. By so doing, not only the cathode gas having a high temperature from the start-up burner 7 via the branch path 115 but also the cathode off-gas having a low temperature from the fuel cell stack 1 via the path 123 and the path 124 is supplied to the exhaust gas burner 8, so that raising of the temperature in the exhaust gas burner 8 is suppressed; and thus, the temperature therein is within the range in which the catalytic oxidation reaction can proceed. When the process of S714 is over, the switching process of the cathode off-gas discharge route (S71) is terminated.

According to the first embodiment, following advantageous effects can be obtained.

The fuel cell system 100 of the first embodiment wherein the fuel cell stack 1 is caused to generate a power comprises: the compressor 5 with which the cathode gas is supplied to the fuel cell stack 1 via the paths 111, 112, 113, and 114 (cathode gas supply route); the start-up burner 7 (first burner) arranged in the cathode gas supply route; the exhaust gas burner 8 (second burner) in which the anode off-gas and cathode off-gas, both being discharged from the fuel cell stack 1, are burnt; the branch path 116 (first branch path) which is, in the cathode gas supply route, branched out in the upstream of the start-up burner 7 and joined in the downstream of the start-up burner 7; and the branch path 115 (second branch path) which is, in the cathode gas supply route, branched out in the downstream of the start-up burner 7 and joined to the paths 123 and 124 (cathode off-gas discharge route) through which the cathode off-gas discharged from the fuel cell stack 1 is directed to the exhaust gas burner 8.

In addition, the fuel cell system 100 comprises: the valve 15 (first valve) with which shut-down and conduction of the branch path 116 (first branch path) are switched over; and the valve 13 (second valve) with which the discharge destination of the cathode gas from the start-up burner 7 (first burner) is switched over either to the fuel cell stack 1 or to the path 124 (cathode off-gas discharge route) via the branch path 115 (second branch path).

When the stop process of the fuel cell system 100 is started, the temperature of the fuel cell stack 1 falls; and, thus, the temperature of the exhaust gas burner 8 falls, so that there is a risk that the catalytic combustion reaction does not proceed properly in the exhaust gas burner 8. Accordingly, in the fuel supply stop process (S21), by operating the valve 15 so as to conduct the branch path 116, the cathode gas supplied from the compressor 5 is supplied to the fuel cell stack 1 via the branch path 116 (first branching control step: S213). And, the valve 13 is operated so as to conduct the branch path 115, thereby supplying the cathode gas, which is to be supplied to the fuel cell stack 1 from the start-up burner 7, to the exhaust gas burner 8 (second branching control step: S214). And, the exhaust gas burner 8 is started (first burner start-up step: S215).

By so doing, the cathode gas having a low temperature is supplied to the fuel cell stack 1 via the branch path 116. Accordingly, the cathode gas having a high temperature from the start-up burner 7 is not supplied to the fuel cell stack 1; and thus, the fuel cell stack 1 can be cooled efficiently.

Further, even if the fuel cell stack 1 is cooled, the cathode gas having a high temperature via the start-up heater 7 is supplied to the exhaust gas burner 8; and thus, the temperature fall of the exhaust gas burner 8 can be suppressed. Accordingly, the catalytic combustion reaction in the exhaust gas burner 8 proceeds properly, so that leakage of the unburnt gas included in the anode off-gas to outside the fuel cell system 100 can be suppressed.

The fuel cell system 100 of the first embodiment further comprises the exhaust gas path 129 (exhausting path) which is branched out from upstream of the junction point of the branch path 115 (second branching path) in the paths 123 and 124 (cathode off-gas path) and is capable of discharging the cathode off-gas.

In addition, the fuel cell system 100 comprises the valve 16 (exhausting valve) which switches the discharge destination of the cathode off-gas from the fuel cell stack 1 over to the exhaust gas burner 8 (second burner) or to outside the fuel cell system 100 via the exhaust gas path 129 (exhausting path).

As the temperature Tc of the fuel cell system 100 falls, the temperature of the cathode off-gas falls. Accordingly, because the cathode off-gas having a low temperature is supplied from the fuel cell stack 1 which is in the course of cooling, the temperature of the exhaust gas burner 8 becomes the temperature at which the catalytic oxidation reaction cannot proceed even if the gas having a high temperature discharged from the start-up burner 7 is supplied via the branch path 115. Accordingly, if the temperature of the fuel cell is lower than a prescribed temperature (discharge route change temperature Tc1), the exhaust gas path 129 is conducted by controlling the valve 16. By so doing, the cathode off-gas having a low temperature discharged from the fuel cell stack 1 to the path 123 is not supplied to the exhaust gas burner 8 via the path 124 but discharged to outside the fuel cell stack 1 from the exhaust gas path 129 (discharge route change step: S23 and S231). Because of this, fall of the temperature in the exhaust gas burner 8 is suppressed thereby leading to the temperature range in which the catalytic oxidation reaction can proceed properly, so that the catalytic combustion reaction can proceed properly. By so doing, leakage of the unburnt gas included in the anode off-gas to outside the fuel cell system 100 can be suppressed.

Meanwhile, as a modified example, by operating the valve 16 in accordance of the temperature of the exhaust gas burner 8, the switching control (discharge route switching step: S71) may be further executed with regard to whether the cathode off-gas is discharged to outside the fuel cell system 100 from the exhaust gas path 129 or is supplied to the exhaust gas burner 8 via the path 124. For example, if the temperature of the exhaust gas burner 8 falls so that the temperature becomes lower than the lower temperature limit (lower burning temperature limit) at which the catalytic reaction can proceed (S711: Yes), the valve 16 is controlled so as to conduct the exhaust gas path 129, so that the cathode off-gas is discharged to outside the fuel cell system 100 from the exhaust gas path 129 (S712). Because of this, flow of the cathode off-gas having a low temperature into the exhaust gas burner 8 is suppressed; and thus, the temperature of the exhaust gas burner 8 becomes higher than the lower temperature limit at which the catalytic reaction can proceed, so that the catalytic oxidation reaction can proceed properly. On the other hand, if the temperature of the exhaust gas burner 8 is risen to the temperature higher than the upper temperature limit (upper burning temperature limit) at which the catalytic reaction can proceed (S713: Yes), the valve 16 is controlled so as to conduct the exhaust gas path 129, so that only the cathode gas having a high temperature from the start-up burner 7 is supplied to the exhaust gas burner 8 via the branch path 115 (S714). Because of this, the temperature of the exhaust gas burner 8 becomes lower than the upper temperature limit at which the catalytic oxidation reaction can properly proceed, so that the catalytic reaction can properly proceed.

Also, the fuel cell system 100 of the first embodiment further comprises the air heat exchanger 6 which is arranged in the upstream side of the branching point of the branch path 116 (second branch path) in the path 112 (cathode gas supply route) and utilizes the exhaust gas from the exhaust gas burner 8 (second burner).

By arranging the air heat exchanger 6 as mentioned above, the cathode gas heated by the air heat exchanger 6 is supplied to the fuel cell stack 1 during the fuel cell system 100 is stopped. Because of this, the fuel cell stack 1 is prevented from being rapidly cooled, so that the anode electrode and so forth in the fuel cell sack 1 can be prevented from cracking.

Also, the fuel cell system 100 of the first embodiment further comprises the branch path 105 (third branch path) which is branched out from the path 103 (anode gas supply route) and joins to the paths 121 and 122 (anode off-gas discharge route) between the fuel cell stack 1 and the exhaust gas burner 8 (second burner).

Also, the fuel cell system 100 comprises the valve 11 (third valve) with which the supply destination of the anode gas is switched over to the fuel cell stack 1 or to the path 122 (anode off-gas discharge route) via the branch path 105 (third branch path).

By operating the valve 11 so as to conduct the branch path 105 during the fuel cell system is stopped, the fuel remaining in the fuel supply system after the fuel supply is stopped can be supplied not to the fuel cell stack 1 but to the exhaust gas burner 8 (third branch path conduction step: S251). Accordingly, after the fuel supply is stopped, the fuel is not supplied to the fuel cell stack 1 at all, so that power generation of the fuel cell stack 1 can be stopped more promptly; and thus, the stopping time of the fuel cell system 100 can be made shorter. In addition, because the fuel remaining in the fuel supply system can be used in the exhaust gas burner 8, use amount of the fuel can be suppressed.

Second Embodiment

In the second embodiment, an example in which the fuel cell stack 1 is proactively cooled down will be explained.

Figure 9:
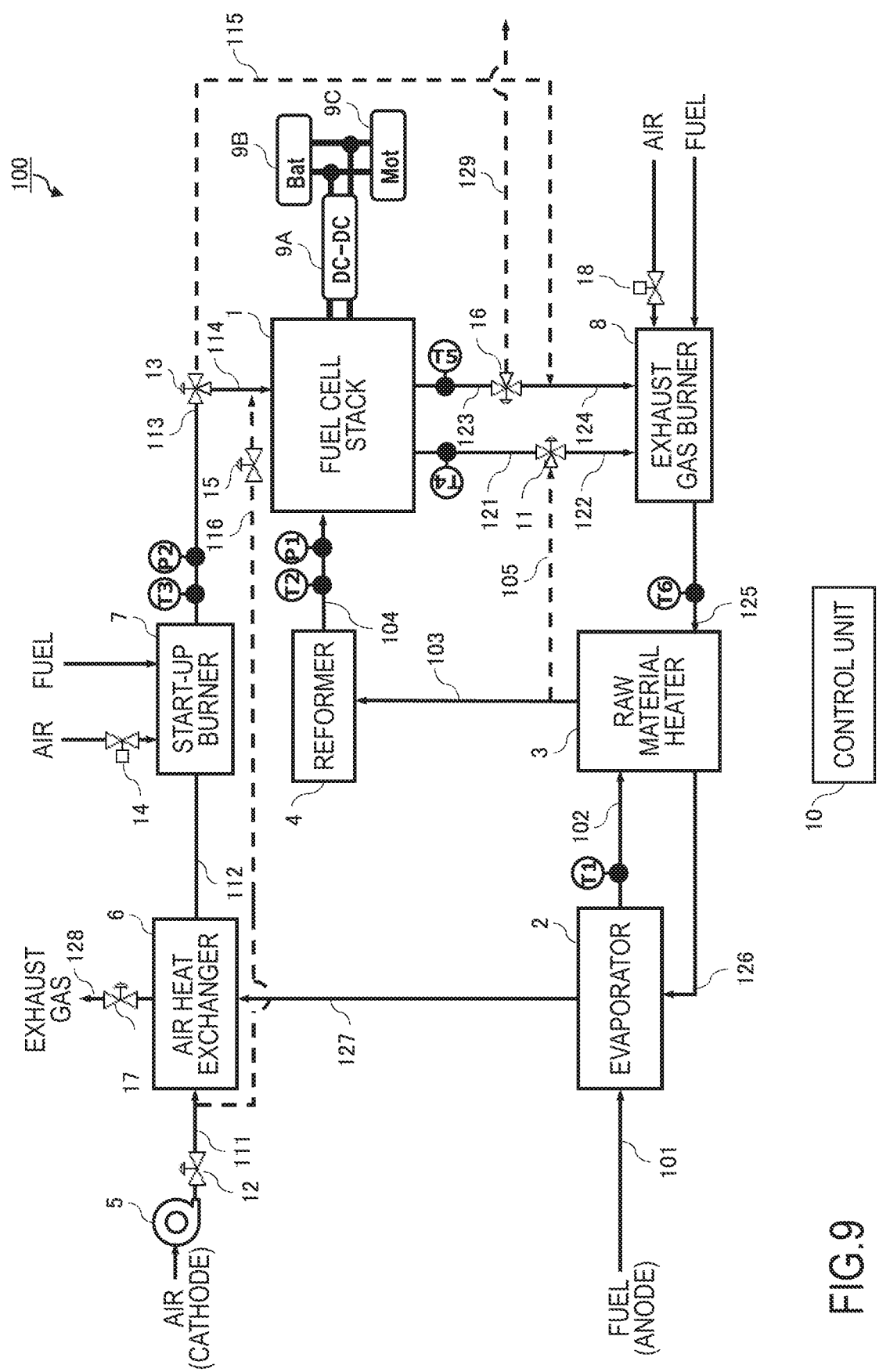
FIG. 9 is a schematic diagram of the fuel cell system according to the second embodiment.

FIG. 9 is the diagram illustrating the configuration of the fuel cell system 100 of the second embodiment during normal operation thereof. The configuration illustrated in this figure is different from the fuel cell system 100 of the first embodiment in the point that the path 114 is branched out from the upstream of the air heat exchanger 6.

Figure 10:
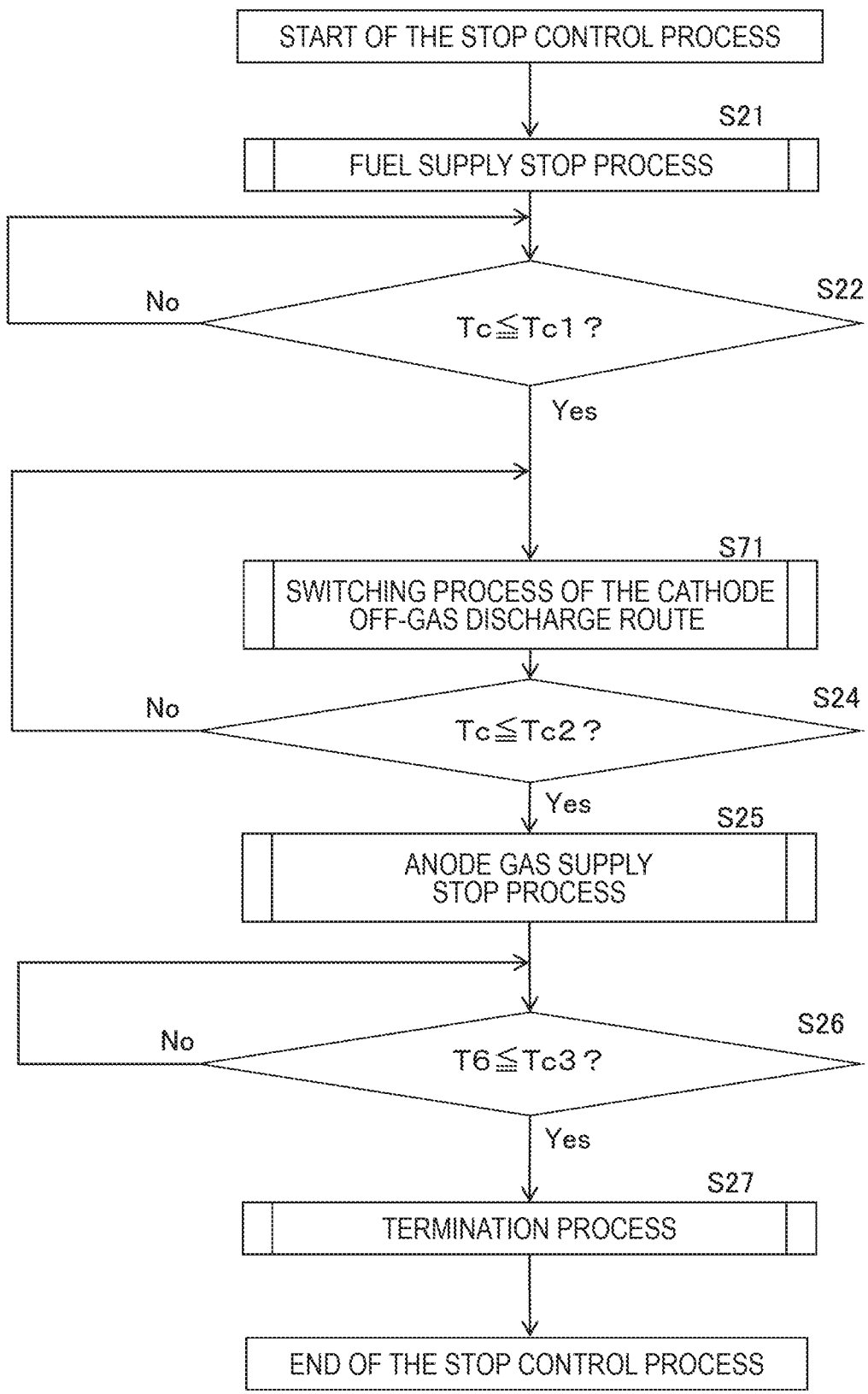
FIG. 10 is a flow chart illustrating the stop control of the fuel cell system.

FIG. 10 is the figure showing the stop process of the fuel cell system 100 of this embodiment. Comparing with other stop control process of the first embodiment shown in FIG. 7, the process in this figure lacks the process of Step S23. Meanwhile, the same processes as those of the first embodiment are executed in the fuel supply stop process (S21), the switching process of the cathode off-gas discharge route (S71), the anode gas supply stop process (S25), and the termination process (S27).

As shown in the figure, after the fuel supply stop process (S21), when the temperature Tc of the fuel cell stack becomes the stop temperature Tc2 (S24: Yes) and before the anode gas supply stop process (S25) starts, the switching process of S71 is executed. Because of this, the temperature of the exhaust gas burner 8 is always the temperature at which the catalytic oxidation reaction can proceed properly; and thus, discharge of the unburnt gas included in the anode off-gas to outside air can be suppressed.

According to the second embodiment, following advantageous effects can be obtained.

The fuel cell system 100 of the second embodiment further comprises, between the branching-out point of the first branch path and the start-up burner 7 (first burner) in the cathode gas supply route, the air heat exchanger 6 which utilizes the exhaust gas from the exhaust gas burner 8 (second burner).

With the configuration as mentioned above, the cathode gas not passing via the air heat exchanger 6 thereby having a normal temperature is supplied to the fuel cell stack 1. Accordingly, the fuel cell stack 1 can be rapidly cooled down, so that the stopping time of the fuel cell system 100 can be made shorter.

In addition, as compared with the stop control process of the first embodiment depicted in FIG. 7, the stop control process illustrated in FIG. 10 lacks the change process of the cathode-off gas discharge route (S23). By so doing, the processing load of the control unit 10 can be made lighter.

In the above description, embodiments of the present invention have been explained. However, the embodiments described above are mere partial examples of the application of the present invention; and thus, the description does not intend to limit the claims of the present invention within the specific composition of these embodiments. Furthermore, the embodiments described above can be arbitrarily combined.

The present application claims a priority of Japanese Patent Application No. 2015-244487 filed with the Japan Patent Office on Dec. 15, 2015, and all the contents of which are hereby incorporated by reference.

The invention claimed is:

1. A fuel cell system, wherein the fuel cell system comprises a solid oxide fuel cell which generates a power by receiving a supply of an anode gas and a cathode gas, and the system comprises:
a cathode gas supply unit to supply the cathode gas to the fuel cell via a cathode gas supply route;
a first burner arranged in the cathode gas supply route,
a second burner to burn an anode off-gas and a cathode off-gas, which are discharged from the fuel cell;
a first branch path which is branched out from an upstream of the first burner and joins to the fuel cell, the first branch path configured to supply cooler cathode gas than during normal operation to the fuel cell in a process of stopping the fuel cell system; and
a second branch path which is branched out from a downstream of the first burner and is configured to receive hotter cathode gas than during normal operation from the first burner in the process of stopping the fuel cell system and joins to a cathode off-gas discharge route through which the cathode off-gas is discharged from the fuel cell to the second burner to supply the hotter cathode gas than during normal operation from the first burner to the second burner in the process of stopping the fuel cell system.

2. The fuel cell system according to claim 1, wherein the system further comprises:
a first valve to switch over between shut-down and conduction of the first branch path; and
a second valve to switch a destination of the cathode gas discharged from the first burner over either to the fuel cell or to the cathode off-gas discharge route via the second branch path.

3. The fuel cell system according to claim 1, wherein the system further comprises:
an exhaust gas path which is branched out from an upstream of a junction point of the second branch path in the cathode off-gas discharge route and through which the cathode off-gas is discharged to outside the fuel cell system.

4. The fuel cell system according to claim 3, wherein the system further comprises:
an exhausting valve with which destination of the cathode off-gas discharged from the fuel cell is switched over either to the second burner or to outside the fuel cell system via the exhaust gas path.

5. The fuel cell system according to claim 1, wherein the system further comprises:
a heat exchanger to heat the cathode gas, arranged in an upstream of a branching-out point of the first branch path in the cathode gas supply route.

6. The fuel cell system according to claim 1, wherein the system further comprises:
a heat exchanger to heat the cathode gas, arranged between a branching-out point of the first branch path and the first burner in the cathode gas supply route.

7. The fuel cell system according to claim 1, wherein the system further comprises:
a third branch path which is branched out from an anode gas supply route to supply the anode gas to the fuel cell and joins to an anode off-gas discharge route through which the anode off-gas is discharged from the fuel cell to the second burner.

8. The fuel cell system according to claim 7, wherein the system further comprises:
a third valve with which supply destination of the anode gas is switched over either to the fuel cell or to the anode off-gas discharge route via the third branch path.

9. A control method to control a fuel cell system comprising:
a solid oxide fuel cell which generates a power by receiving a supply of an anode gas and a cathode gas,
a cathode gas supply unit to supply the cathode gas to the fuel cell via a cathode gas supply route;
a first burner arranged in the cathode gas supply route,
a second burner to burn an anode off-gas and a cathode off-gas, which are discharged from the fuel cell;
a first branch path which is branched out from an upstream of the first burner and joins to a downstream of the first burner in the cathode gas supply route; and
a second branch path which is branched out from a downstream of the first burner in the cathode gas supply route and joins to a cathode off-gas discharge route through which the cathode off-gas is discharged from the fuel cell to the second burner; and the method executes:

in a process of stopping the fuel cell system, a first branch path control step in which by conducting the first branch path, the cathode gas supplied from the cathode gas supply unit is supplied to the fuel cell via the first branch path, a second branch path control step in which by conducting the second branch path as well as by shutting down between the first burner and the fuel cell in the cathode gas supply route, the cathode gas is supplied from the cathode gas supply unit to the second burner via the first burner, and a first burner start-up step to start up the first burner.

10. The control method according to claim 9, wherein the fuel cell system further comprises:

an exhaust gas path which is branched out from an upstream of a junction point of the second branch path in the cathode off-gas discharge route and through which the cathode off-gas is discharged to outside the fuel cell system; and the method further executes:

in a process of stopping the fuel cell system, an exhaust gas route change step in which when a temperature of the fuel cell is lower than a prescribed temperature, by conducting the exhaust gas path, the cathode off-gas is discharged from the fuel cell to outside the fuel cell system via the exhaust gas path.

11. The control method according to claim 9, wherein the fuel cell system further comprises:

an exhaust gas path which is branched out from an upstream of a junction point of the second branch path in the cathode off-gas discharge route and through which the cathode off-gas is discharged to outside the fuel cell system; and the method further executes:

in a process of stopping the fuel cell system, an exhaust gas route switching step in which when a temperature of the second burner is higher than an upper burning temperature limit, the cathode off-gas is discharged from the fuel cell to the second burner by shutting down the exhaust gas path, and when the temperature of the second burner is lower than a lower burning temperature limit, the cathode off-gas is discharged from the fuel cell to outside the fuel cell system via the exhaust gas path by conducting the exhaust gas path.

12. The control method according to claim 9, wherein the fuel cell system further comprises:

a third branch path which is branched out from an anode gas supply route to supply the anode gas to the fuel cell and joins to an anode off-gas discharge route through which an anode off-gas is discharged from the fuel cell to the second burner; and the method further executes:

in a process of stopping the fuel cell system, a third branch path conducting step in which by conducting the third branch path, supply of the anode gas to the fuel cell is stopped, and at the same time the anode gas is supplied to the second burner.

* * * * *